US007529906B2

(12) United States Patent
Sheets

(10) Patent No.: US 7,529,906 B2
(45) Date of Patent: May 5, 2009

(54) SHARING MEMORY WITHIN AN APPLICATION USING SCALABLE HARDWARE RESOURCES

(75) Inventor: Kitrick Sheets, Morrisville, NC (US)

(73) Assignee: Cray Incorporated, Seattle, WA (US)

( * ) Notice: Subject to any disclaimer, the term of this patent is extended or adjusted under 35 U.S.C. 154(b) by 0 days.

(21) Appl. No.: 10/643,588

(22) Filed: Aug. 18, 2003

(65) Prior Publication Data

US 2005/0044339 A1 Feb. 24, 2005

(51) Int. Cl.
*G06F 12/00* (2006.01)
(52) U.S. Cl. ........................................ 711/206; 711/147
(58) Field of Classification Search .................. 711/206, 711/207, 147
See application file for complete search history.

(56) References Cited

U.S. PATENT DOCUMENTS

| | | | |
|---|---|---|---|
| 5,430,850 A | 7/1995 | Papadopoulos et al. | |
| 5,446,915 A | 8/1995 | Pierce | |
| 5,560,029 A | 9/1996 | Papadopoulos et al. | |
| 5,649,141 A | 7/1997 | Yamazaki | |
| 5,860,146 A | 1/1999 | Vishin et al. | |
| 5,897,664 A | 4/1999 | Nesheim et al. | |
| 6,003,123 A | 12/1999 | Carter et al. | |
| 6,101,590 A * | 8/2000 | Hansen | 711/203 |
| 6,105,113 A * | 8/2000 | Schimmel | 711/146 |
| 6,490,671 B1 * | 12/2002 | Frank et al. | 711/207 |
| 6,684,305 B1 * | 1/2004 | Deneau | 711/159 |
| 6,922,766 B2 | 7/2005 | Scott | |
| 6,925,547 B2 * | 8/2005 | Scott et al. | 711/207 |
| 2002/0169938 A1 | 11/2002 | Scott et al. | |
| 2002/0172199 A1 | 11/2002 | Scott et al. | |
| 2004/0044872 A1 * | 3/2004 | Scott | 711/202 |

OTHER PUBLICATIONS

Chen, Y. , et al., "UTLB: A Mechanism for Address Translation on Network Interfaces", *Proceedings of the Eighth International Conference on Architectural Support for Programming Languages and Operating Systems (ASPLOS)*, (1998),193-204.
Kontothanassis, L. , et al., "VM-based shared memory on low-latency, remote-memory-access networks", *Proceedings of the ACM ISCA '97*, (1997),157-169.

(Continued)

*Primary Examiner*—Sheng-Jen Tsai
(74) *Attorney, Agent, or Firm*—Schwegman, Lundberg & Woessner, P.A.

(57) ABSTRACT

Systems and methods include translating a virtual memory address into a physical memory address in a multi-node system that is initiated by providing the virtual memory address at a source node. A determination is made that a translation for the virtual memory address does not exist. A physical node to query is determined based on the virtual memory address. An emulated remote translation table (ERTT) segment is queried on the determined physical node to see if the ERTT segment may provide a translation. If the translation is received then the translation may be loaded into a TLB on the source node. Otherwise a memory reference error may be generated for the entity or application referencing the invalid virtual memory address.

13 Claims, 4 Drawing Sheets

OTHER PUBLICATIONS

Scott, S. , "Synchronization and Communication in the T3E Multi-processor", *ASPLOS*, vol. III, (1996),pp. 26-36.

Wood, D. A., et al., "An In-Cache Address Translation Mechanism", *Proceedings of the 13th Annual International Symposium on Computer Architecture*, (1986),358-365.

"U.S. Appl. No. 10/235,898, Non Final Office Action mailed Jul. 7, 2004", 10 pgs.

"U.S. Appl. No. 10/235,898, Response filed Jan. 6, 2005 to Non Final Office Action mailed Jul. 7, 2004", 16 pgs.

"U.S. Appl. No. 10/235,898 Notice of Allowance mailed Mar. 15, 2005", 4 pgs.

* cited by examiner

SHARING MEMORY WITHIN AN APPLICATION USING SCALABLE HARDWARE RESOURCES

RELATED FILES

This application is related to U.S. patent application Ser. No. 10/643,758, entitled "REMOTE TRANSLATION MECHANISM FOR A MULTINODE SYSTEM", filed on even date herewith; to U.S. patent application Ser. No. 10/235,898 (now U.S. Pat. No. 6,922,766), entitled "REMOTE TRANSLATION MECHANISM FOR A MULTINODE SYSTEM", filed Sep. 4, 2002; to U.S. patent application Ser. No. 10/643,744, entitled "Multistream Processing System and Method", filed on even date herewith; to U.S. patent application Ser. No. 10/643,577, entitled "System and Method for Synchronizing Memory Transfers", filed on even date herewith; to U.S. patent application Ser. No. 10/643,742, entitled "Decoupled Store Address and Data in a Multiprocessor System", filed on even date herewith; to U.S. patent application Ser. No. 10/643,586 (now U.S. Pat. No. 7,334,110), entitled "Decoupled Scalar/Vector Computer Architecture", filed on even date herewith; to U.S. patent application Ser. No. 10/643,585, entitled "Latency Tolerant Distributed Shared Memory Multiprocessor Computer", filed on even date herewith; to U.S. patent application Ser. No. 10/643,754, entitled "Relaxed Memory Consistency Model", filed on even date herewith; to U.S. patent application Ser. No. 10/643,758, entitled "Remote Translation Mechanism for a Multinode System", filed on even date herewith; and to U.S. patent application Ser. No. 10/643,741 (now U.S. Pat. No. 7,437,521), entitled "Method and Apparatus for Local Synchronizations in a Vector Processor System", filed on even date herewith, each of which is incorporated herein by reference.

FIELD

The present invention relates memory management in computer systems, and more particularly to systems and methods for sharing memory using scalable hardware resources.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Cray, Inc. All Rights Reserved.

BACKGROUND

Multiprocessor computer systems include a number of processing nodes connected together by an interconnection network. Typically, each processing node includes one or more processors, a local memory, and an interface circuit connecting the node to the interconnection network. The interconnection network is used for transmitting packets of information between processing nodes.

Distributed, shared-memory multiprocessor systems include a number of processing nodes that share a distributed memory element. By increasing the number of processing nodes, or the number of processors within each node, such systems can often be scaled to handle increased demand. In such a system, each processor is able to access local memory, or memory of other (remote) processing nodes. Typically, a virtual address is used for all memory accesses within a distributed, shared-memory multiprocessor system, and is translated into a physical address in the requesting node's translation look-aside buffer (TLB). Thus, the requesting node's TLB will need to contain address translation information for all the memory that the node is able to access (local or remote). This amount of address translation information can be substantial, and can result in much duplication of translation information throughout the multiprocessor system (e.g., if the same page of memory is accessed by 64 different nodes, the TLB used by each node will need to contain an entry for that page). This type of system does not scale efficiently to very large memories.

Therefore, there is a need for an address translation mechanism in a multi-processor system that addresses these and other shortcomings. As a result, there is a need in the art for the present invention.

SUMMARY

The above-mentioned shortcomings, disadvantages and problems are addressed by the present invention, which will be understood by reading and studying the following specification.

One aspect of the systems and methods includes translating a virtual memory address into a physical memory address in a multi-node system that is initiated by providing the virtual memory address at a source node. A determination is made that a translation for the virtual memory address does not exist. A physical node to query is determined based on the virtual memory address. An emulated remote translation table (ERTT) segment is queried on the determined physical node to see if the ERTT segment may provide a translation. If the translation is received then the translation may be loaded into a TLB on the source node. Otherwise a memory reference error may be generated for the entity or application referencing the invalid virtual memory address.

A further aspect is that the ERTT segment may be located in generally accessible node memory, e.g. memory that is available for general purpose use by applications and the kernel.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
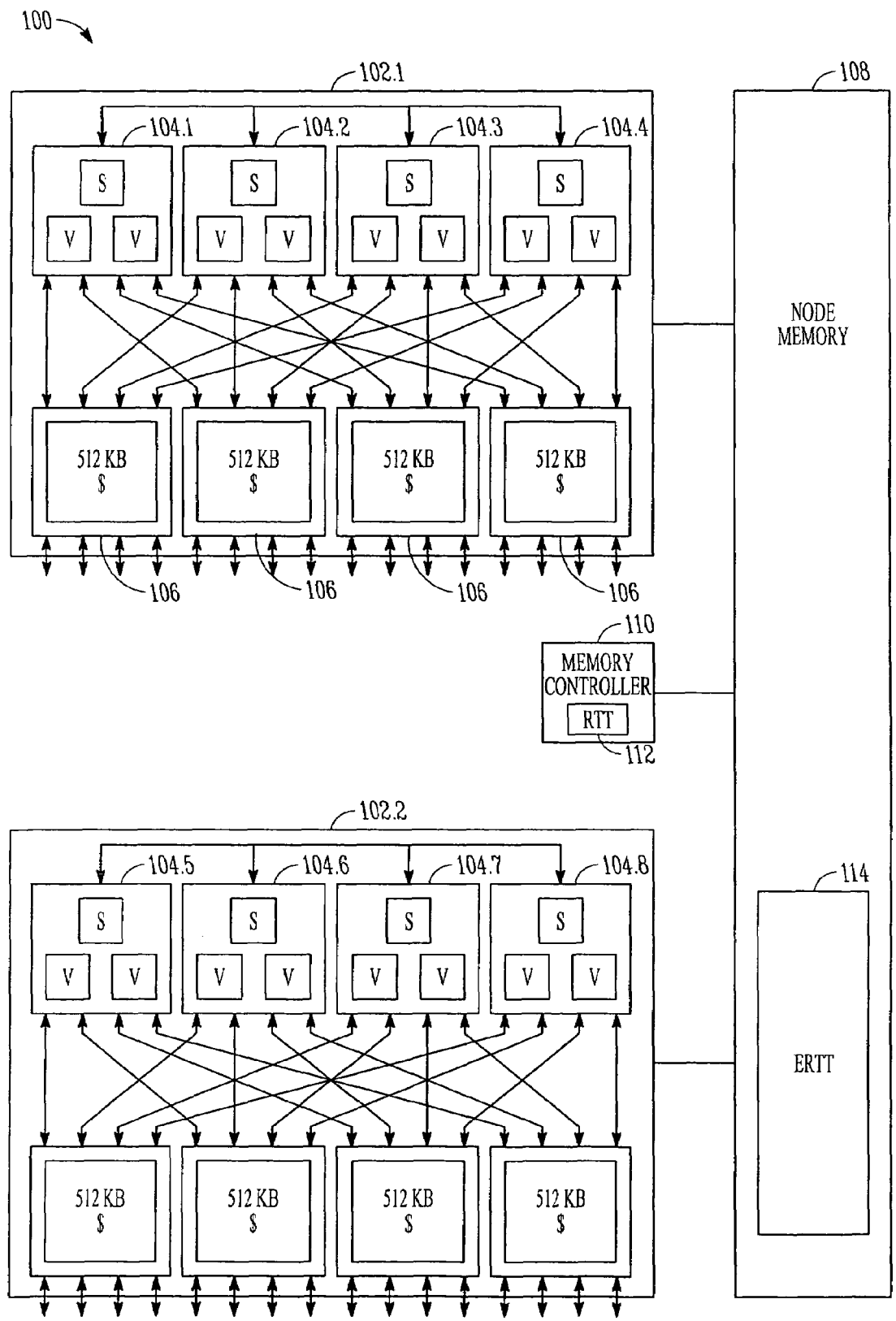
FIG. 1 is a block diagram of parallel processing hardware and operating environment in which different embodiments of the invention can be practiced.

FIG. 1 is a block diagram of parallel processing hardware and operating environment 100 in which different embodiments of the invention can be practiced. In some embodiments, environment 100 comprises a node 101 which includes two or more multiple processor units 102. Although two multiple processor units 102.1 and 102.2 are shown in FIG. 1, it will be appreciated by those of skill in the art that other number of multiple processor units may be incorporated in environment 100 and in configurations other than in a node 101. In some embodiments of the invention, node 101 may include up to four multiple processor units 102. Each of the multiple processor units 102 on node 101 has access to node memory 108, which may be controlled by one or more memory controllers 110. In some embodiments, node 101 is a single printed circuit board and node memory 108 comprises daughter cards insertable on the circuit board.

In some embodiments of the invention, memory controller 110 includes a remote translation table (RTT) 112. The RTT 112 contains translation information for a virtual memory address space associated with one or more remote nodes. Further details on the operation of RTT 112 are found in U.S. patent application Ser. No. 10/235,898, entitled "REMOTE TRANSLATION MECHANISM FOR A MULTINODE SYSTEM", which has been previously incorporated by reference.

Additionally, some embodiments of the invention include an emulated RTT (ERTT) 114. In FIG. 1, a logical representation of ERTT 114 is shown as a single entity residing in node memory 108. However, in some embodiments, ERTT 114 comprises at least two data structures, and may reside in node memories 108 for more than one node 101. It is desirable to locate ERTT 114 in a generally accessible (e.g. accessible by both applications and the kernel) node memory 108, because the kernel may manage the ERTT 114 without resorting to specialized hardware memory mapping such as that involved with the RTT. Further details on the structure and operation of ERTT 114 will be provided below.

In some embodiments, a multiple processor unit 102 includes four processors 104.1-104.4 and four cache memory controllers 106. Although each multiple processor unit is shown in FIG. 1 as having four processors, those of skill in the art will appreciate that other embodiments of the invention may have more or fewer processors 104. In some embodiments, each processor 104 incorporates scalar processing logic (S) and vector processing logic (V). In some embodiments, each cache memory control 106 may access 512 KB of memory. Each of processor 104 may access any one or more of the cache memory controllers 106.

In one embodiment, the hardware environment is included within the Cray X1 computer system, which represents the convergence of the Cray T3E and the traditional Cray parallel vector processors. The X1 is a highly scalable, cache coherent, shared-memory multiprocessor that uses powerful vector processors as its building blocks, and implements a modernized vector instruction set. In these embodiments, multiple processor unit 102 is a Multi-streaming processor (MSP). It is to be noted that FIG. 1 illustrates only one example of a hardware environment, and other environments (for other embodiments) may also be used.

Figure 2:
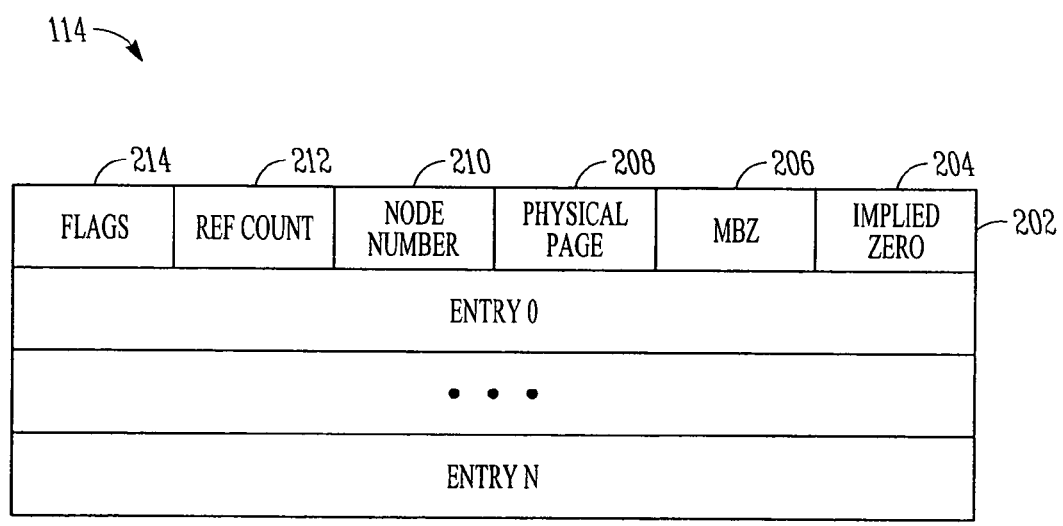
FIG. 2 is a block diagram of an emulated remote translation table segment according to an embodiment of the invention.

FIG. 2 is a block diagram of an ERTT segment 202 that is included as part of ERTT 114 according to an embodiment of the invention. In some embodiments, ERTT segment 202 is a table of entries related to providing virtual to physical address translation. In some embodiments, each entry is 64 bits wide and comprises an implied zero field 204, must be zero field (MBZ) 206, physical page 208, node number 210, reference count 212 and flags 214. Implied zero field 204 comprises bits that are typically set to zero as they are not significant in the address translation. Similarly, MBZ field 206 comprises bits that are typically set to zero as they are also not significant in the address translation. It should be noted that these fields may or may not be physically present in the table. For example, implied zero field 204 may not physically exist, but software executing on the system may assume that these bits would be zero when performing address translation.

Physical page 208 comprises a page number of the physical page for an address. In some embodiments, page boundaries may range from 64 KB to 4 GB.

Node number 210 comprises a node number identifying the physical node where the page resides.

Reference count 212 represents a count of the number of processes currently mapping the page. As an example consider two processes A and B. A references pages P1 and P2, while B references pages P1 and P3. The reference count for the ERTT segment entry for page P1 will be 2 because both A and B reference page P1. The reference count for the ERTT segment entries for pages P2 and P3 will be 1 because only one of A or B references the page. Now assume that process B terminates. The reference count for page P3 goes to zero, the reference count for page P1 is set to 1 to reflect the fact that process B no longer references those pages. In some embodiments, when a reference count for an ERTT segment entry goes to zero, the entry is removed and made available for later reuse. In addition, in some embodiments a corresponding entry in the RTT is also cleared and made available for reuse.

Flags 214 comprise a set of flags for the entry. In some embodiments, the flags may include a lock flag indicating that the entry should be locked to prevent another process from altering the entry thereby providing for serial access to the ERTT segment entry. A valid flag indicates that the that the translation in the ERTT segment entry is a valid entry. A write flag indicates whether the page is writable or not.

In some embodiments of the invention, an ERTT segment may contain 16K entries, however no embodiment of the invention is limited to any particular number of entries.

Figure 3:
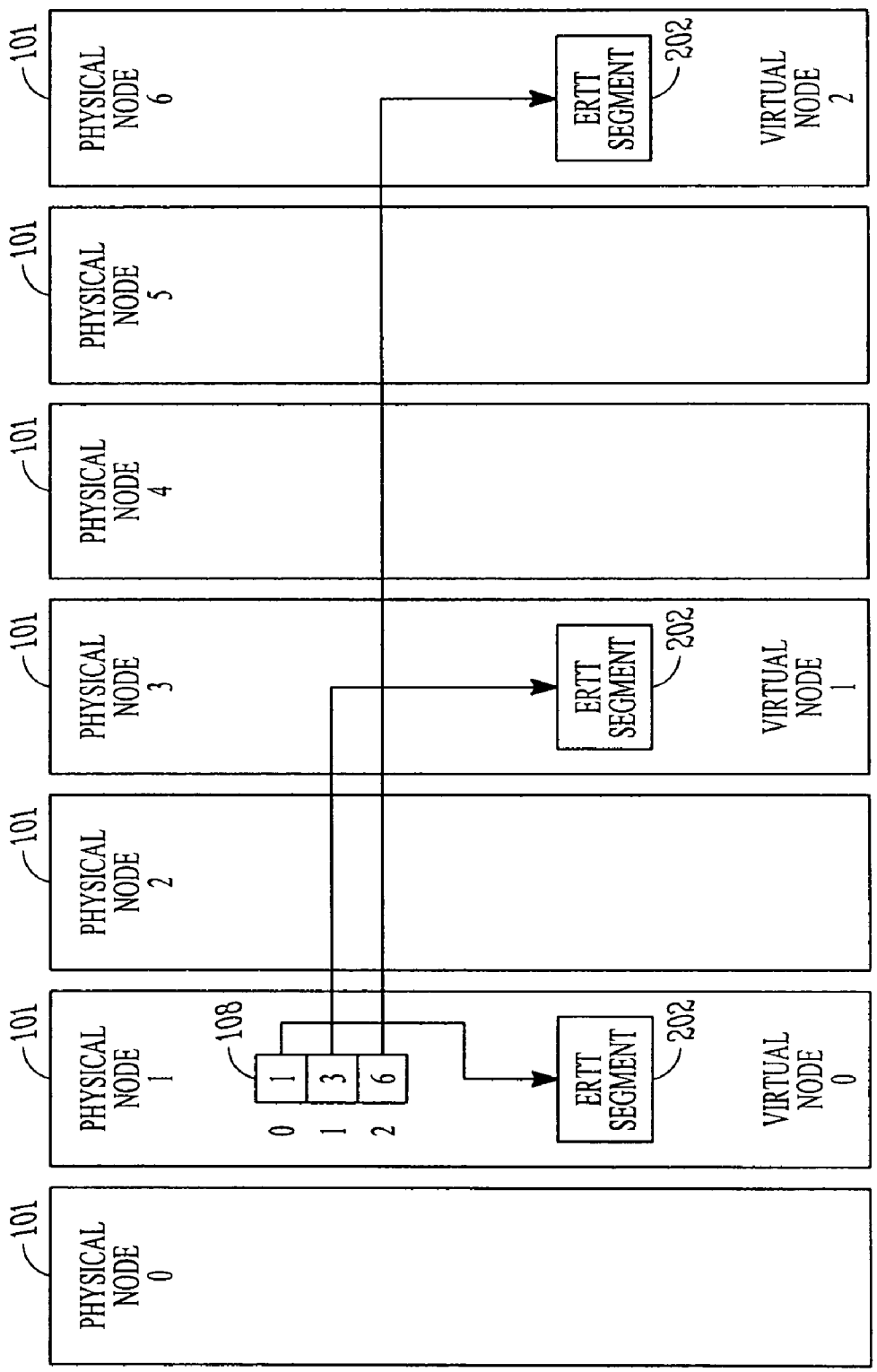
FIG. 3 is a block diagram illustrating an exemplary configuration for using an emulated remote translation table according to an embodiment of the invention.

FIG. 3 is a block diagram illustrating an exemplary configuration for using an emulated remote translation table according to an embodiment of the invention. In the exemplary configuration, a number of nodes 101 are present in a system. An application is assigned to run on three of the nodes, physical nodes 1, 3 and 6. These physical nodes are mapped to virtual nodes 0, 1 and 2. Such a mapping is desirable, because some implementations of the RTT require that nodes assigned to an application using the RTT be contiguously numbered. Providing a virtual node that is physically contiguous while mapping to a set of physical nodes that need not be physically contiguous provides for more flexibility in allocating nodes to an application while maintaining compatibility with structures and software that require that nodes be contiguous.

In some embodiments of the invention, an ERTT header 302 is maintained by one of the nodes of the application. In some embodiments, the ERTT header 302 is maintained at a "well known" location in the group of nodes assigned to an application. However, in alternative embodiments, ERTT header 302 may be replicated in all nodes assigned to an application. Further, in some embodiments, ERTT 114 includes an ERTT header 302 that is maintained by virtual node 0 assigned to the application. ERTT header 302 maps virtual nodes to physical nodes. The index into ERTT header is a virtual node number, and the value at that location is the physical node number corresponding to the virtual node number. The ERTT segment 202 may then be located using the physical node number. Thus in the example shown, ERTT header 302 establishes a mapping between virtual nodes 0, 1 and 2 and physical nodes 1, 3 and 6 respectively.

Figure 4:
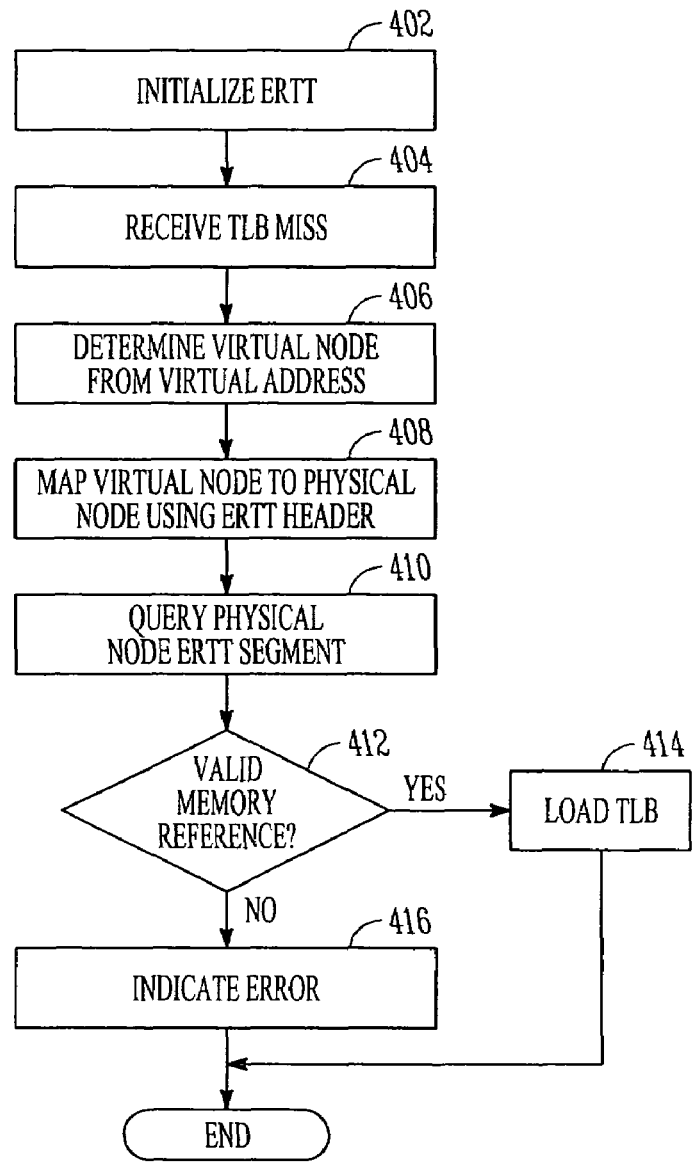
FIG. 4 is a flowchart illustrating a method according to an embodiment of the invention.

FIG. 4 is a flowchart illustrating a method for maintaining an ERTT 114 in a parallel processing environment according to an embodiment of the invention. The method to be performed by the operating environment constitutes computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The method illustrated in FIG. 4 is inclusive of acts that may be taken by an operating environment executing an exemplary embodiment of the invention.

The method begins when an ERTT is initialized (block 402). In some embodiments, an ERTT is initialized in node memory 108 when an application is assigned to run on one or more nodes. In some embodiments, an ERTT is maintained through the use of memory mapping functions such as "madvise", "mmap", "shmget" and the like. Further details on maintaining an RTT and systems and methods that are also applicable to maintaining an ERTT may be found in U.S. patent application Ser. No. 10/643,758, entitled "REMOTE TRANSLATION MECHANISM FOR A MULTINODE SYSTEM" which has been previously incorporated by reference. Additionally, the ERTT may be initialized through the normal page fault mechanism of the kernel. As page faults occur, the kernel reads pages into memory and loads the appropriate ERTT segment entry with a translation. In some embodiments, memory must be referenced locally to cause the ERTT to be loaded before a remote node attempts to access local memory.

At some point after the ERTT has been initialized, processes running on one of the nodes assigned to an application may attempt to access a virtual address that is not mapped by the TLB (Translation Lookaside Buffer) for the node. This cause a TLB miss which in turn causes memory management routines in the kernel to execute (block 404). For convenience, one or more kernel memory management routines executed upon a TLB miss will be referred to collectively as the TLBmiss routine.

The TLBmiss routine will then attempt to map the referenced page. In some embodiments, the TLBmiss routine uses predetermined bits of the virtual address as a virtual node number (block 406). The TLBmiss routine may the consult the ERTT header 302 in order to determine the physical node having the physical address corresponding to the virtual address (block 408). In some embodiments, if the virtual node maps to the same node that the application or kernel is running on, the standard operating system memory management routines may be used to make the translation to a physical page on the local node.

However, if the reference is to a remote node, the TLBmiss routine then uses the offset portion of the virtual address as an index to query the determined physical node's ERTT segment 202 to determine if the address is valid on the physical node (block 410). If the physical node's ERTT segment 202 has a translation for the virtual address, then the translation is placed in the referring (i.e. the local or source) node's TLB (block 414) In some embodiments, the ERTT segment entry may be placed directly into the TLB because the ERTT entry format matches the TLB format with respect to all significant bites.

Otherwise, an invalid reference has occurred and the kernel indicates a memory reference error to the application (block 416). This may cause the application to terminate.

Conclusion

Systems and methods for managing virtual address translation using scalable resources for an emulated remote translation table have been disclosed. The systems and methods described provide advantages over previous systems. One advantage is that because kernel memory management routines process the translation immediately upon a TLB miss, the application instruction causing the miss may be precisely determined and appropriate error processing may take place.

This is unlike the RTT, where numerous instructions may take place between the time translation is requested and the time that an invalid reference is determined, thereby rendering the kernel unable to determine which instruction caused the invalid reference.

In addition, in some embodiments, the kernel always uses the ERTT for memory references. In some embodiments, entry into kernel mode turns off use of the RTT and turns on use of the ERTT for virtual to physical address translation. As a result, the kernel is typically protected from invalid references that would otherwise cause an undesirable kernel crash (also referred to as a kernel panic).

Furthermore, in some embodiments, applications may choose between using the ERTT or the RTT. If an application chooses to use the ERTT, then the system may assign the application to run on non-contiguous physical nodes that appear to the application to be contiguous through the use of virtual nodes, thereby increasing the flexibility and potentially improving the resource utilization of the nodes on the system. In addition, the use of virtual nodes does not require any changes or recompiles of the underlying application software in order to take advantage of the increased flexibility provided by the ERTT.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

I claim:

1. A method for translating a virtual memory address into a physical memory address in a multi-node system, the method comprising:
   maintaining a remote translation table (RTT) to store virtual to physical memory translations;
   maintaining in a generally accessible memory an emulated remote translation table (ERTT) segment to store virtual to physical memory translations;
   providing the virtual memory address at a source node;
   determining that a translation for the virtual memory address does not exist;
   determining that the ERTT is to be used to translate the virtual memory address and that the RTT is not to be used to translate the virtual memory address, wherein determining that the ERTT is to be used includes determining that the source node is operating in a kernel mode;
   determining a virtual node to query based on the virtual memory address; accessing an ERTT header to obtain a mapping of the virtual node to a physical node;
   querying the ERTT segment on the physical node for the translation for the virtual memory address; and
   loading the translation into a translation lookaside buffer (TLB) on the source node.

2. The method of claim 1, further comprising locating the ERTT header at a well known location to one or more nodes used by an application.

3. The method of claim 2, wherein the ERTT header is located on a predetermined virtual node.

4. A computerized system for managing virtual address translations, the system comprising:
   a plurality of nodes available for executing programs, each of said nodes having a node memory;
   an RTT on each of the plurality of nodes for managing virtual address translations;
   an ERTT to store virtual to physical memory translations, wherein the ERTT is in a different memory from the RTT
   an ERTT header having one or more mappings of virtual nodes to physical nodes;
   an operating system executable by a source node of the plurality of nodes, the operating system operable to:
   receive a virtual memory address at the source node;
   determine that a translation for the virtual memory address does not exist on the source node;
   determining that the ERTT is to be used to translate the virtual memory address and that the RTT is not to be used to translate the virtual memory address, wherein determining that the ERTT is to be used includes determining that the source node is operating in a kernel mode;
   determine a virtual node to query based on the virtual memory address; access the ERTT header to obtain a physical node mapped by the virtual node; query an
   the ERTT in the generally accessible memory on the physical node for the translation for the virtual memory address; and
   loading the translation into a translation lookaside buffer (TLB) on the source node.

5. The system of claim 4 wherein the ERTT header at a well known location to one or more nodes used by an application.

6. The system of claim 5, wherein the ERTT header is located on a predetermined virtual node.

7. A computer-readable medium having computer executable instructions for executing a method for translating a virtual memory address into a physical memory address in a multimode system, the method comprising:
   maintaining a remote translation table (RTT) to store virtual to physical memory translations;
   maintaining in a generally accessible memory an emulated remote translation table (ERTT) segment to store virtual to physical memory translations, wherein the RTT is in a different memory from the ERTT;
   providing the virtual memory address at a source node;
   determining that a translation for the virtual memory address does not exist;
   determining that the ERTT is to be used to translate the virtual memory address and that the RTT is not to be used to translate the virtual memory address, wherein determining that the ERTT is to be used includes determining that the source node is operating in a kernel mode;
   determining a virtual node to query based on the virtual memory address;
   accessing an ERTT header to obtain a mapping of the virtual node to a physical node;
   querying the ERTT segment on the physical node for the translation for the virtual memory address; and
   loading the translation into a translation lookaside buffer (TLB) on the source node.

8. The computer-readable medium of claim 7, wherein the method further comprises locating the ERTT header at a well known location to one or more nodes used by an application.

9. The computer-readable medium of claim 8, wherein the ERTT header is located on a predetermined virtual node.

10. The method of claim 1, further comprising replicating the ERTT header on a plurality of physical nodes.

11. The system of claim 5, further comprising a plurality of replicated ERTT headers provided on a plurality of physical nodes.

12. The computer-readable medium of claim 8, wherein the method further comprises replicating the ERTT header on a plurality of physical nodes.

13. The method of claim 1, wherein determining that the ERTT is to be used includes determining that an application has chosen to use the ERTT.

* * * * *

UNITED STATES PATENT AND TRADEMARK OFFICE
CERTIFICATE OF CORRECTION

PATENT NO. : 7,529,906 B2  Page 1 of 1
APPLICATION NO. : 10/643588
DATED : May 5, 2009
INVENTOR(S) : Kitrick Sheets It is certified that error appears in the above-identified patent and that said Letters Patent is hereby corrected as shown below:

On page 2, in column 1, under "Other Publications", line 2, delete "vol. III," and insert -- vol. II, --, therefor.

In column 8, line 26, in Claim 4, after "query" delete "an".

In column 8, line 32, in Claim 5, delete "claim 4" and insert -- claim 4, --, therefor.

Signed and Sealed this

Twelfth Day of January, 2010

David J. Kappos
*Director of the United States Patent and Trademark Office*